United States Patent [19]
Kuno et al.

[11] Patent Number: 5,350,312
[45] Date of Patent: Sep. 27, 1994

[54] FEEDER CONNECTOR

[75] Inventors: Hiromichi Kuno; Toshiyuki Sekimori, both of Aichi; Shigemitsu Inaba; Toshiaki Hasegawa, both of Shizuoka, all of Japan

[73] Assignees: Yazaka Corporation, Tokyo; Toyota Jidosha Kabushiki Kaisha, Toyat, both of Japan

[21] Appl. No.: 165,886

[22] Filed: Dec. 14, 1993

[30] Foreign Application Priority Data

Dec. 18, 1992 [JP] Japan ................. 4-338739

[51] Int. Cl.⁵ .......................................... H01R 13/62
[52] U.S. Cl. ................................. 439/310; 439/352; 439/372
[58] Field of Search ............ 439/32, 48, 135, 136, 439/142, 310, 352, 353, 357, 358, 372

[56] References Cited

U.S. PATENT DOCUMENTS 4,509,807  4/1985  Reimpell et al. ........... 439/32
4,722,697  2/1988  Naruse et al. .............. 439/310
4,952,160  8/1990  Olsen ......................... 439/142

FOREIGN PATENT DOCUMENTS

60-24539  6/1985  Japan .
61-49988  4/1986  Japan .

Primary Examiner—Khiem Nguyen
Attorney, Agent, or Firm—Armstrong, Westerman, Hattori, McLeland, and Naughton

[57] ABSTRACT

The feeder connector consists of feeding-side and receiving-side connectors. The feeding-side connector includes a casing consisting of split-type cases fastened to each other, a connector body slidably installed in a front half section of the casing, and a handle movably mounted in a rear half section of the casing such that it advances through rotation of a lever to push the connector body against the receiving-side connector, the handle also serving as lead wires-passing tube. The lever includes a first locking means for locking the connector body in an engaged state with a mating connector body of the receiving-side connector, a second locking means operated through energizing an electromagnetic coil, and a means for releasing the lever from the locking by the first locking means after the locking by the second locking means is released by deenergizing. The feeder connector prevents the feeding-side and receiving-side connectors from detachment during feeding in charging an electric vehicle and has a simple structure suitable for multi-polarization.

12 Claims, 10 Drawing Sheets

FEEDER CONNECTOR

BACKGROUND OF THE INVENTION

1. Field of the Invention

The present invention relates to a feeder connector used for charging, for example, an electric vehicle and, more particularly, to a feeder connector in which its feeding-side and receiving-side connectors are easily fitted and connected and reliably prevented from accidental detachment during feeding and which has so simplified a structure that multi-polarization may be attained easily.

2. Description of the Prior Art

Figure 9:
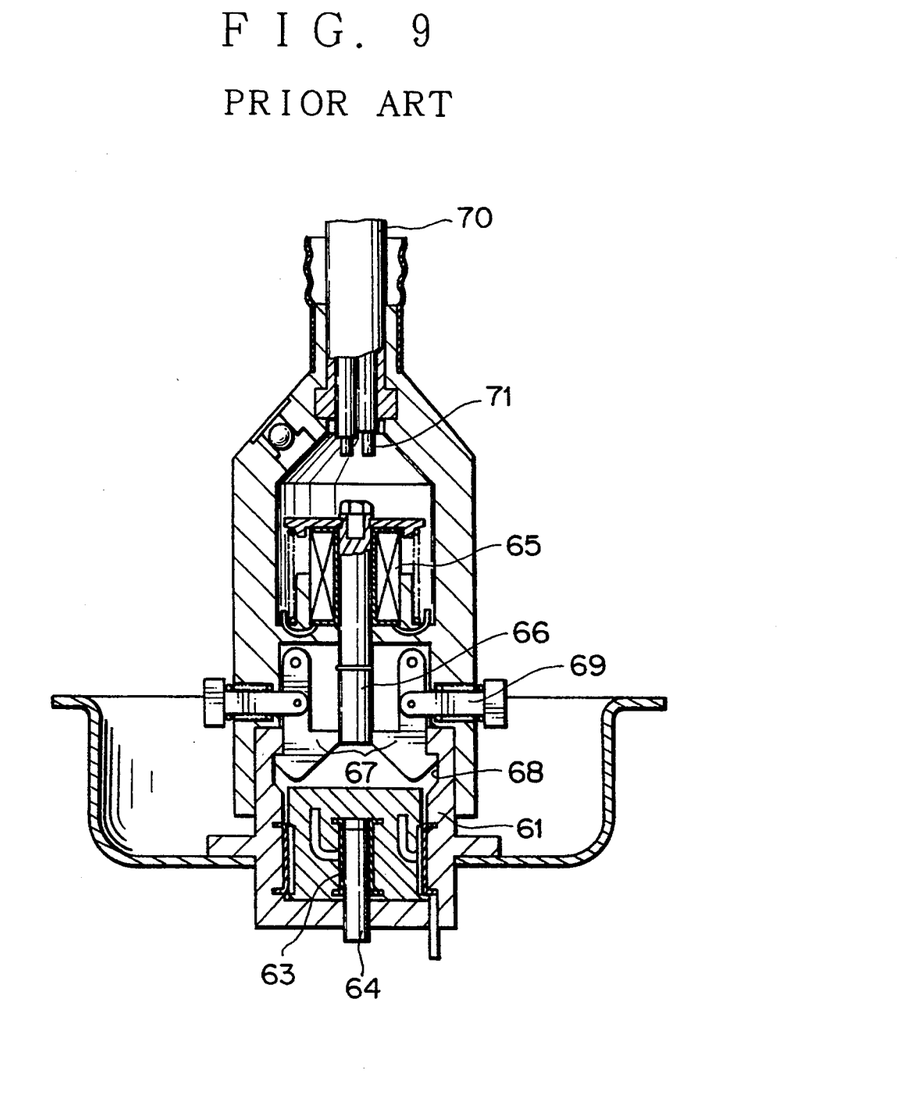
FIG. 9 is a longitudinal sectional view of a conventional feeder connector with its feeding side and receiving side connectors shown fitted.
Figure 10:
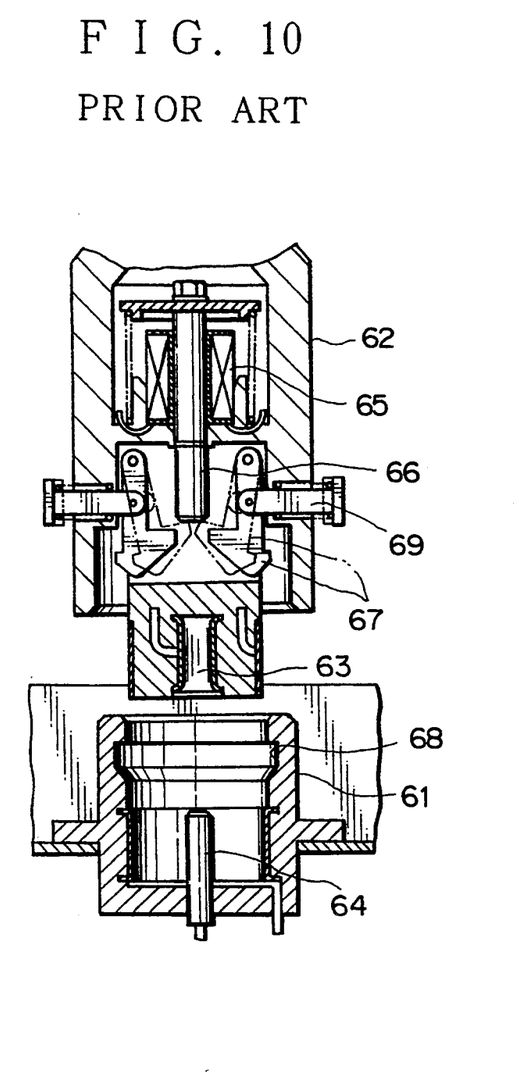
FIG. 10 is a sectional view of the feeder connector of FIG. 9 with the feeding-side and receiving-side connectors shown separated.

FIGS. 9 and 10 show an example of a conventional feeder connector, which is disclosed in Japanese Patent Publication No. Sho 60-24539.

This feeder connector consists of a female connector (receiving-side connector) 61 fixed to the body of an automobile or the like and a cylindrically-shaped male connector (feeding-side connector) 62 provided on the side of a feeder apparatus. In this feeder connector, if male connector 62 is fitted in female connector 61, female and male terminals 63, 64 are fitted and connected and a pair of locking pieces 67, 67 engage an annular groove 68.. On starting feeding, an electro-magnetic coil 65 is energized and a plunger 66 is lowered to such a position as will lock locking pieces 67, 67, so that female and male connectors 61 and 62 are not separated during feeding. On completion of the feeding, electro-magnetic coil 65 is deenergized to allow plunger 66 to rise to a non-locking position, and the connectors may be separated by pressing disengagement members 69 and releasing locking pieces 67 from annular groove 68.

In the conventional feeder connector, the above-described locking pieces 67, 67, electro-magnetic coil 65 and plunger 66 of the feeding-side connector 62 are disposed on the fitting axis of the connectors. As a result, they interfere with the exit (wiring path) of lead wires 71 of a cable 70, making the feeder connector complicated inside, large-sized and unsuitable for multi-polarization.

SUMMARY OF THE INVENTION

This invention has been accomplished to overcome the above-mentioned problems and one of its objects is to provide a feeder connector in which mating connectors are easily fitted and connected, which has a simplified inner structure suitable for multi-polarization and which securely prevents detachment of the mating connectors during feeding.

In order to attain the object, according to the present invention, there is provided a feeder connector including a feeding-side connector provided on the side of a feeder apparatus and a receiving-side connector provided on a vehicle body Or the like, the feeding-side connector comprising: a casing made up of a pair of split-type cases fastened to each other, a connector body slidably installed in a front half section of the casing and accommodating a plurality of terminals, a pipe-like handle mounted in a rear half section of the casing, coaxially slidable with the connector body, the handle passing lead wires connected to said plurality of terminals therethrough, a lever with an intermediate portion thereof rotatably supported inside the casing, the lever including a working portion pivotally attached to the handle and an operating portion extending outside the casing, the lever, when rotated, causing the handle to move forwardly to bring the connector body into engagement with a mating connector body of the receiving-side connector, a first locking means that locks the lever in position such that the connector body and the mating connector body are maintained engaged with each other, a second locking means that locks the lever through energizing of an electro-magnetic coil after the lever is locked by the first locking means, and a means for releasing the lever from the first locking means after the lever is released from the second locking means through deenergizing of the magnetic coil.

When the lever is rotated towards the handle by hand, the handle moves forwards to press the connector body of the feeding-side connector against the receiving-side connector, at which time the feeding-side and receiving-side connectors are very easily fitted and connected. During feeding, the lever that causes the handle to move forwardly or retract is doubly locked, thereby excluding detachment of the connectors. This handle has a pipe-shaped configuration through which the lead wires connected to the connector body-accommodated terminals pass and is advantageously employed in wiring a multiplicity of lead wires or multi-polarization. The feeder connector of this invention does not require large force since the mating connectors are fitted by a lever, has a relatively simple inner structure and may easily be miniaturized owing to the handle that also serves as through-pipe for the lead wires.

Further objects and advantages of the present invention will be apparent from the following description of the preferred embodiment of the invention as illustrated in the accompanying drawings.

DETAILED DESCRIPTION OF PREFERRED EMBODIMENT

As shown in FIG. 1 to FIG. 4, a feeder connector of this invention consists of a feeding side-connector A which is provided on the side of a not-shown feeder apparatus and a receiving-side connector B which is fixed to the body of an automobile or the like.

The feeding-side connector A includes a casing 1 consisting of a pair of opposing split-type cases 1A and 1B fastened to each other. Slidably installed inside a front half section of casing 1 is a connector body 2, and mounted in a rear half section of the casing is a handle 4, the handle being axially movable such that on rotating lever 3 it advances to press connector body 2 towards the receiving side-connector B. A cable C extending from a not-shown feeder apparatus is introduced at the rear end of handle 4.

Figure 3:
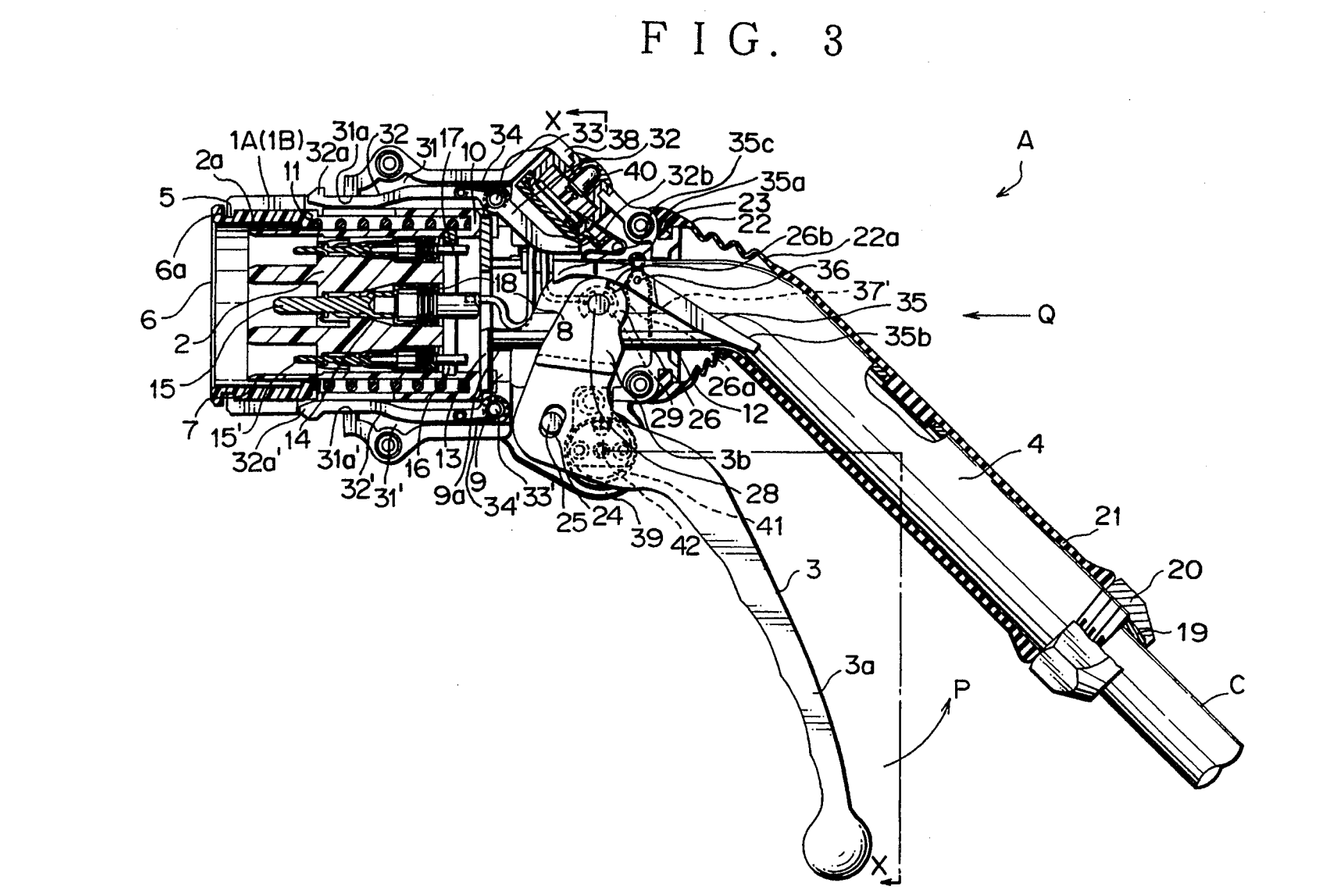
FIG. 3 is a longitudinal sectional view of the connector A of FIG. 1.

Casing 1 is formed at the front end with an inwardly-projecting wall 5 on which is fitted an annular groove 6a of a collar 6 and at an intermediate portion thereof with a partition wall 9 that divides the inside of the casing into a connector body-accommodating section 7 and a lever-attaching section 8. Connector body 2 has a flange 10 formed at its rear end and is slidably installed in connector body-accommodating section 7 between partition wall 9 and collar 6, and a coil spring 11 is interposed between collar 6 and flange 10 so that it normally urges connector body 2 towards the side of handle 4. A front half of handle 4 is inserted into lever-attaching section 8 through an opening 12 at the rear end of casing 1 and passes into connector body-accommodating section 7 through a rounded opening 9a formed in partition wall 9 to get into contact with connector body 2 via a connector-pressing plate 13.

Connector body 2 has a plurality of terminal accommodating chambers 14 formed therein, which contain male terminals 15, 15' locked therein and doubly prevented from rearwardly coming off by a rear holder 16. Each of the male terminals 15, 15' has its rear half connected with a lead wire 17 by contact bonding or other known means and fitted over by a waterproofing rubber 18 for waterproof sealing and preventing a short circuit between neighboring ones of the terminals.

Handle 4 has a pipe-like shape and serves also as a through pipe for lead wires 17 of cable C connected to male terminals 15, 15'. A front half of handle 4 is slidably supported through rounded opening 9a in partition wall 9 and opening 12 at the rear end of casing 1. Handle 4 has an L-shape in side elevation with a rear half thereof bent downwardly, and a locknut 20 is threaded at the rear end via a cable-holding packing 19. Designated 21 is a grip formed from an elastic material such as synthetic rubber, which has a waterproofing cap 22 formed integrally therewith at the front end via a bellows 22a, the waterproofing cap being fitted in an annular groove 23 at the rear end of casing 1.

Figure 5:
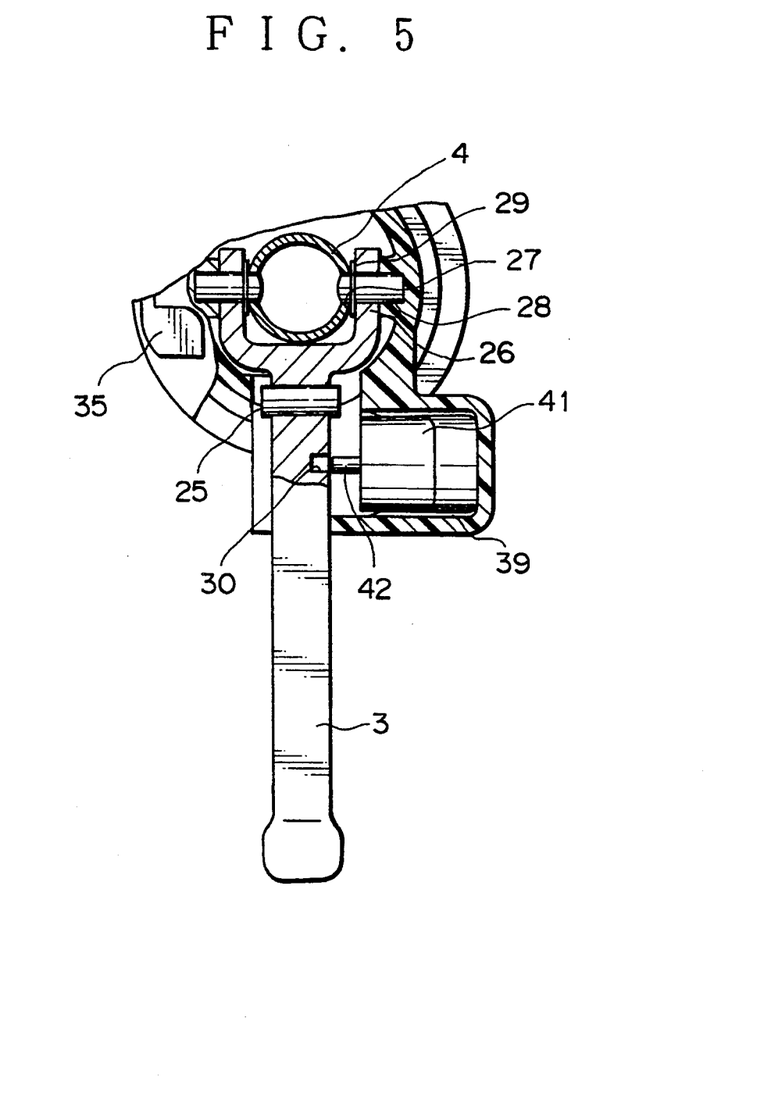
FIG. 5 is a sectional view taken along the line X—X of FIG. 3

Lever 3 is made up of an elongated operating portion 3a and shorter working portion 3b intersecting with each other to form an L-shape. Working portion 3b has an elongated hole 24 formed at a base portion thereof that adjoins operating portion 3a and is rotatably supported on a pin 25 in hole 24 at a lower portion of lever-attaching section 8. The distal end of lever 3 is bifurcated to form two supports 26, 26 as shown in FIG. 5, which are, via pins 28 fitted in a pair of radial holes 27, 27, rotatably supported to handle 4, with a stop ring 29 interposed between each support 26 and handle 4. Support 26 is provided with a circular arc end face 26a and a recess 26b formed on the end face for engagement with a locking claw 35c of a later-described release lever 35. The working portion 3b is further formed with an engagement bore 30 for engagement with a plunger 42 of a later-described electro-magnetic coil 41.

Locking chambers 31, 31' are provided formed bulgedly on the upper and lower sides of lever-attaching section 8 respectively and extending over a portion of connector body-accommodating section 7 with openings 31a, 31a' formed at their front ends. Designated 32, 32' are locking arms for locking the feeding-side and receiving-side connectors A and B to each other. In locking chamber 31, locking arm 32 is supported at an intermediate portion thereof on a pin 33, extends forwardly to the outside of the locking chamber through opening 31a, has a hook-like locking claw 32a projected at the front end, and rearwardly extends to lever-attaching section 8 to form an engagement piece 32b for the later-described release lever 35. Likewise, the other locking arm 32' extends forwardly to the outside of locking chamber 31' through opening 31a', has a sloped, so-called semilock-type locking claw 32a' projected at the front end, and is, in locking chamber 31', supported at the rear end on a pin 33'. Designated 34 and 34' are wire springs that urge locking arms 32, 32' radially outwardly.

Designated 35 is a release lever for releasing the locking by locking arm 32, which release lever is rotatably supported at an intermediate portion thereof to the split-type case 1A via a pin 36, so that its working portion 35a is located between engagement piece 32b of locking arm 32 and one support 26 of lever 3 and its operating portion 35b rearwardly extends to the outside of the casing 1. The working portion 35a is formed at the front end with a downwardly-projecting hook-like locking claw 35c. Designated 37 is a plate spring that urges working portion 35a of release lever 35 towards lever 3 or circular arc end face 26a of support 26, and 37' a hold-down spring for the working portion 3b of lever 3.

Lever-attaching section 8 has an LED-accommodating portion 38 bulgedly formed at a rearward portion thereof for accommodating an LED 40 and a coil-accommodating portion 39 formed at one side of a lower portion thereof for accommodating an electro-magnetic coil 41 provided with an axially movable plunger 42.

Figure 4:
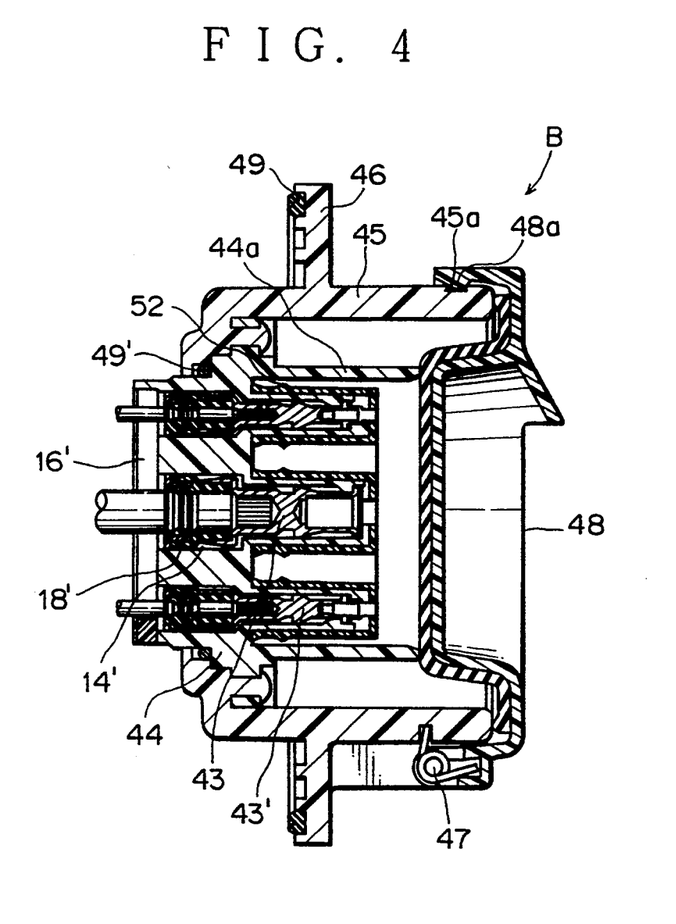
FIG. 4 is a longitudinal sectional view of a receiving-side, hector B corresponding to the feeding-side connector A of FIG. 1.

Receiving-side connector B includes, as shown in FIG. 4, a connector body 44 with female terminals 43, 43' contained and locked therein and a shell 45 sealingly fitted on the outer periphery of the connector body 44 for receiving a front end portion of casing 1 of the feeding-side connector A. Shell 45 is, via a flange 46 circumferentially formed on its outer periphery, bolted (not shown) to an automobile body and, its open end is opened or closed by a cap 48 hinged to the shell via a pin 47, the cap adapted to be locked through engagement between a projection 48a and a recess 45a formed on the cap and the shell, respectively. Designated 14' is a terminal accommodating chamber, 16' a rear holder and 18' a waterproofing rubber. Their structures are similar to those of the feeding-side connector A and their description will be omitted. Designated 49, 49' are packings for waterproof sealing.

For positioning the feeding-side and receiving-side connectors A and B for fitting, casing 1 is formed on an outer surface thereof with an axially-extending projected strip 50, and shell 45 is formed on an inner surface with a corresponding guide groove (not shown). Shell 45 further has an annular groove 51 formed on its inner surface for engagement with locking arms 32, 32' of the feeding-side connector A.

Figure 1:
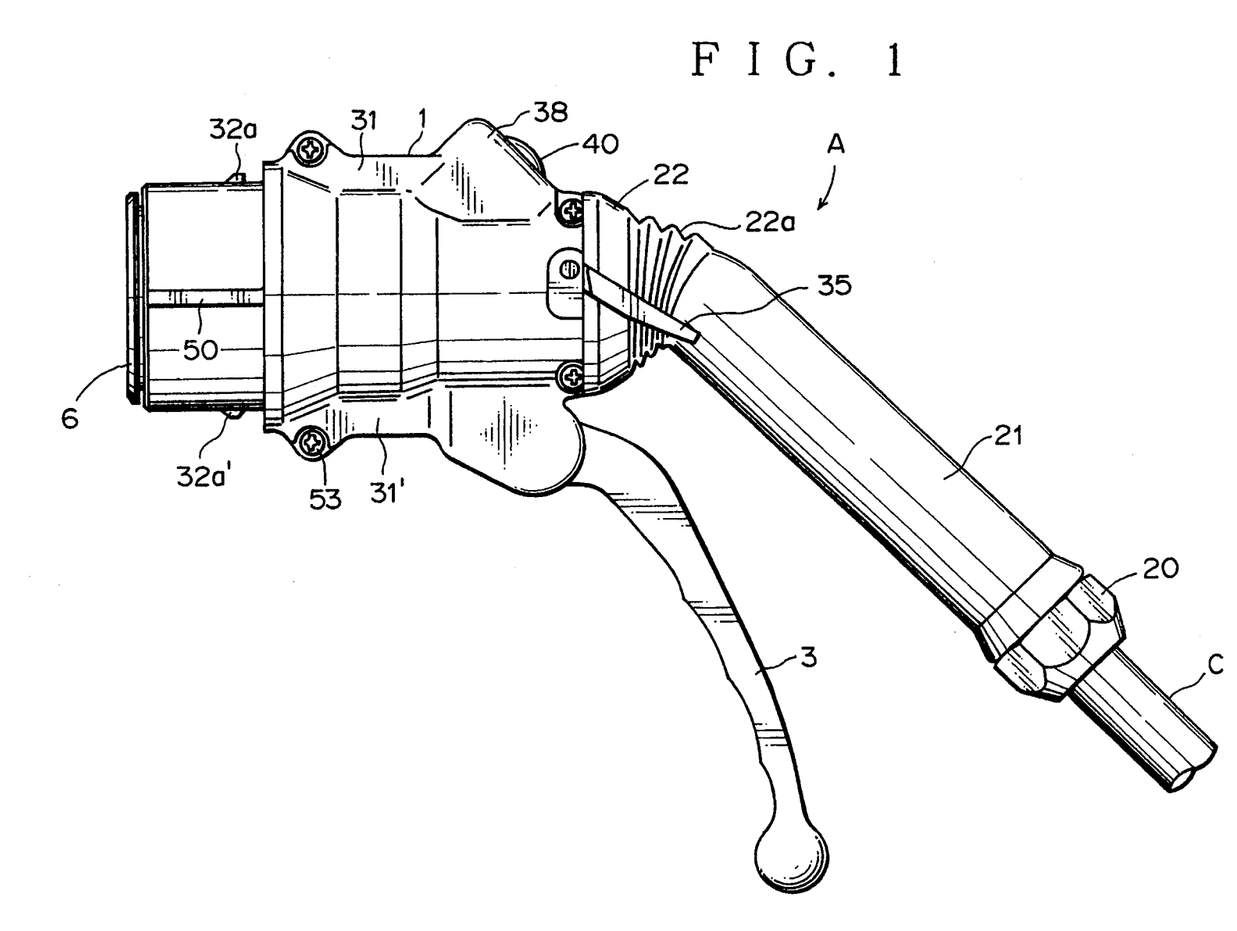
FIG. 1 is a front view of a feeding-side connector A of a feeder connector according to this invention.
Figure 2:
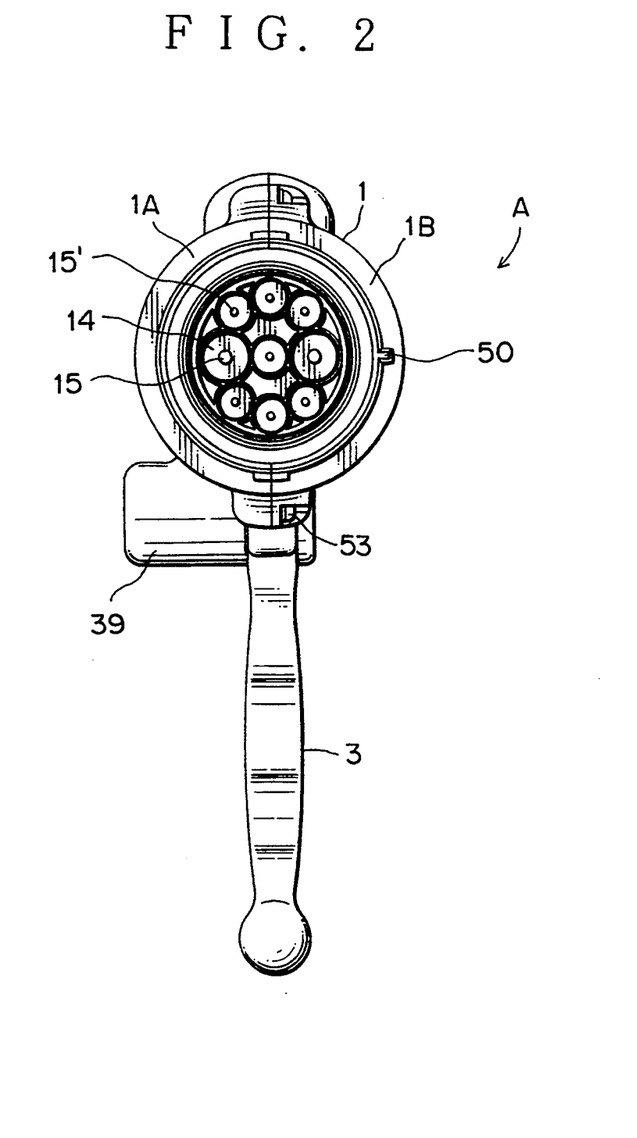
FIG. 2 is a left side view of the connector A of FIG. 1.

A tubular hood 2a is provided extending forwardly of connector body 2 of the feeding-side connector A so as to protect the leading edges of male terminals 15, 15', and connector body 44 of the receiving-side connector B is forwardly extended by a tubular guide wall 44a so as to receive the hood 2a. A waterproof packing 52 is fitted on the outer periphery of each terminal accommodating chamber 14'. Designated 53 in FIG. 1 is a screw for fastening split-type cases 1A and 1B.

While the feeding-side connector A has been described above as containing male terminals 15 and the receiving-side connector B as containing female terminals 43, the connector bodies 2 and 44 may be changed in design so that the male and female terminals are reversely contained.

With the construction as mentioned above, casing 1 of the feeding-side connector A is inserted into shell 45, with the projected strip 50 on the casing put in the corresponding guide groove on the inner surface of the shell, whereby locking claw 32a and semilock-type locking claw 32a' of locking arms 32, 32' are each engaged in annular groove 51 to preliminarily lock the connectors A and B to each other.

Figure 6:
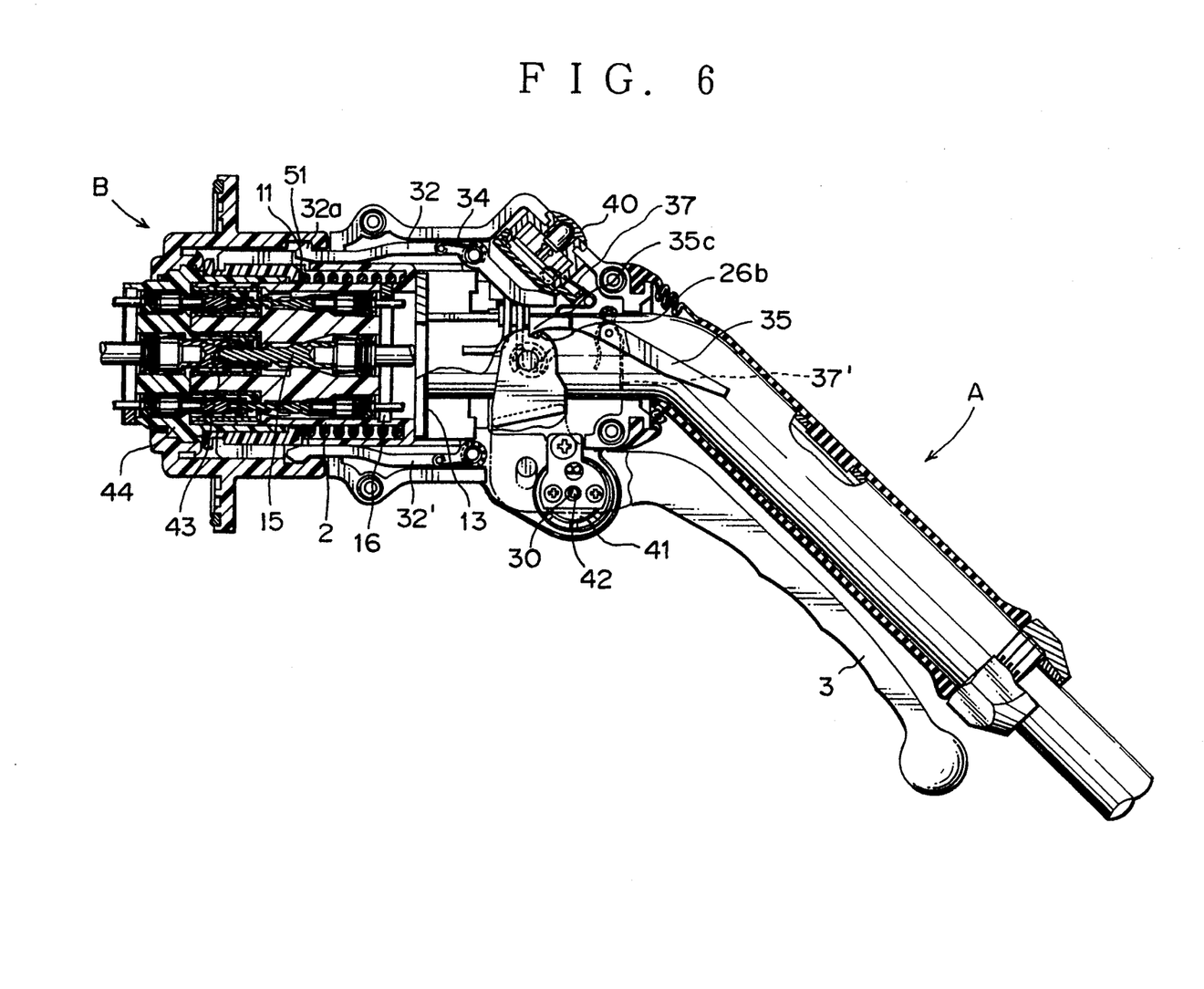
FIG. 6 is a sectional view showing the feeding-side and receiving side connectors A and B in a fitted and locked state.
Figure 7:
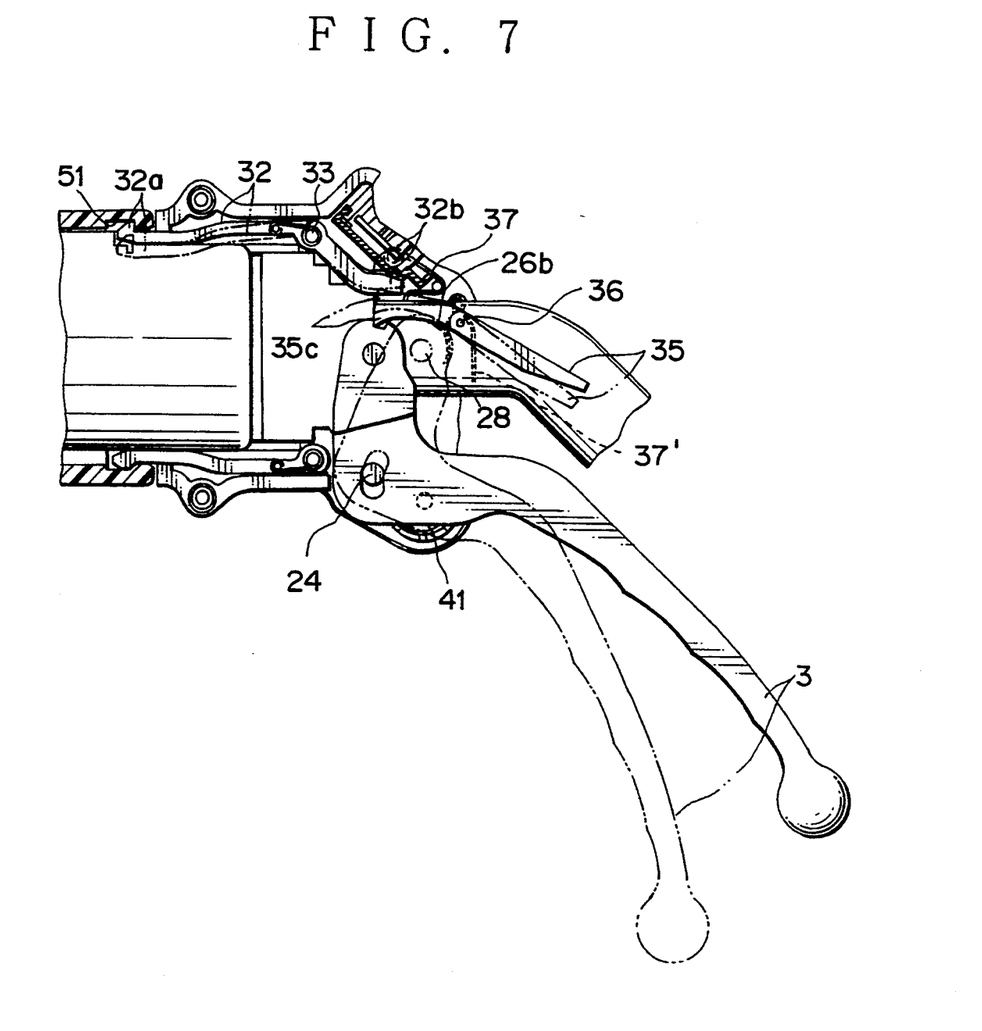
FIG. 7 is a schematic view showing the lever 3 of FIG. in a release state.

Lever 3 is then taken hold of and rotated in the direction of arrow P as shown in FIG. 3 so as to cause the working portion 3b to rotate about pin 25 and handle 4 to advance as a whole in the direction of arrow Q. As a result, connector body 2 is, via connector-pressing plate 13, pushed forwards against the elastic action of coil spring 11 and the connectors A and B or connector bodies 2 and 44 are fully fitted and locked as shown in FIG. 6, resulting in male terminals 15, 15' and female terminals 43, 43' fully connected with each other.

Figure 8:
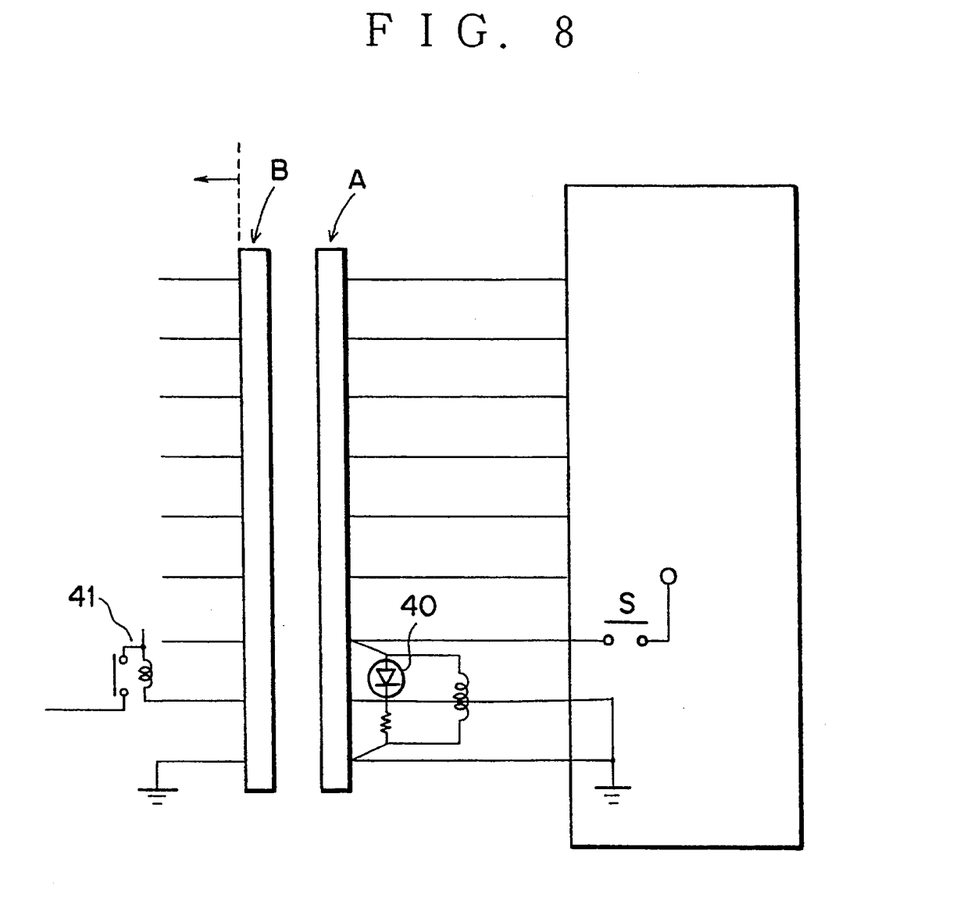
FIG. 8 is a schematic view showing an electric circuit of the feeder connector according to this invention.

If a switch S is turned on in this fully connected condition of the connectors A and B as shown in the circuit diagram of FIG. 8, LED 40 lights up and electro-magnetic coil 41 is energized, thereby moving plunger 42 (FIG. 5) into engagement in the engagement bore 30 of lever 3. This doubly locks lever 3 along with the locking by release lever 35, which is described below. Consequently, if release lever 35 is lowered, lever 3 is maintained in the locked position by plunger 42 of electro-magnetic coil 41, thereby excluding detachment during feeding.

In the coupling process of connector bodies 2 and 44 as mentioned above, as lever 3 rotates in the direction of arrow P in FIG. 3, circular arc end face 26a of support 26 is slidingly contacted with the underside of spring-urged working portion 35a of release lever 35, thereby rotating the working portion 35a upwardly on pin 36, so that on completion of the coupling, locking claw 35c at the front end of the working portion 35a is positioned in the locking recess 26b to lock lever 3.

To detach the connectors A and B after completion of electric feeding, operating portion 35b of release lever 35 extending outside the casing 1 is rotated downwardly to release locking claw 35c from lever 3 or locking recess 26b of lever 3. This allows connector body 2 to part from the mating connector body 44 by the action of coil spring 11. As release lever 35 is further rotated downwardly, the working portion 35a raises engagement piece 32b of locking arm 32 centering around pin 33 so as to lower locking claw 32a at the opposite side. Consequently, locking claw 32a is disengaged from annular groove 51 on the inner surface of shell 45. The other locking claw 32a' of locking arm 32' that engages annular groove 51 is of a semilock-type and may be easily disengaged on drawing the feeding-side connector A.

The connectors A and B may be detached also by simply pulling back handle 4 upon disengagement of the locking claw 35c of release lever 35 from lever 3 since circular arc end face 26a of lever 3 is kept in contact with the working portion 35a' of release lever 35 and causes the engagement piece 32b of locking arm 32 to be raised via the working portion 35a when handle 4 is pulled.

Thus, the feeding-side and receiving-side connectors A and B may be easily fitted and locked or detached by pushing them against each other or pulling them apart from each other in axial direction.

In the fully fitted and locked condition, the front end portion of casing 1 of the feeding-side connector A is fitted in shell 45 of the receiving-side connector B and hood 2a in guide wall 44a, while waterproof packing 52 is interposed between terminal accommodating chambers 14, 14', thus providing a triple waterproof sealing.

The feeder connector of this invention having the construction as mentioned above is relatively simple in inner structure and suitable for multi-polarization and miniaturization, enables the mating connectors to be easily fitted or detached, and reliably prevents detachment during feeding.

What is claimed is:

1. A feeder connector including a feeding-side connector provided on a side of a feeder apparatus and a receiving-side connector provided on a body of a vehicle or the like, said feeding-side connector comprising:
   a casing;
   a connector body slidably installed in a front half section inside said casing and accommodating a plurality of terminals;
   a hollow-shaped handle that allows lead wires connected to said plurality of terminals to pass therethrough;
   a lever at an intermediate portion thereof rotatably supported inside said casing and including an operating portion extending outside said casing, said lever, when rotated, causing said connector body to move forwardly into engagement with said receiving-side connector; and
   an electro-magnetic locking means provided at a position offset from a fitting axis of said connector body for restricting the rotation of said lever such that said connector body and said receiving-side connector are maintained engaged with each other.

2. A feeder connector according to claim 1, wherein said electro-magnetic locking means comprises an electro-magnetic coil energized on sensing a current flow such that said lever is locked against rotation to maintain said connector body and said receiving-side connector engaged with each other.

3. A feeder connector according to claim 2, wherein said electro-magnetic coil is provided with a plunger axially movable, on energizing said magnetic coil, into engagement in a corresponding bore formed on said lever.

4. A feeder connector according to claim 1, wherein said hollow-shaped handle is mounted in a rear half section inside said casing and coaxially slidable with said connector body, and wherein said lever is at a front working portion thereof pivotally attached to said handle so that said connector body is brought into engagement with said receiving-side connector through advancement of the handle.

5. A feeder connector according to claim 4, wherein said handle is formed as a single unit and moves as a whole when said lever is rotated.

6. A feeder connector according to claim 1, wherein said feeding-side connector further comprises a second locking means for locking said lever and a release means for releasing said lever from said second locking means after the locking of said lever by said electro-magnetic locking means is released through deenergizing of the magnetic locking means.

7. A feeder connector according to claim 6, wherein said second locking means and said release means comprise a single release lever rotatably attached at an intermediate portion thereof to said casing and engageable at a front working portion thereof with said lever.

8. A feeder connector according to claim 4, wherein said front half section and said rear half section inside said casing are divided by a partition wall with an opening through which said handle passes to come into contact with said connector body.

9. A feeder connector according to claim 8, wherein said feeding-side connector further comprises a spring means that normally urges said connector body towards said partition wall.

10. A feeder connector according to claim 5, wherein said handle has a rear half portion extended outside said casing and bent downwardly to form a grip portion, and wherein said operating portion of said lever may be grasped together with said grip portion.

11. A feeder connector according to claim 7, wherein said feeding-side connector further comprises a means engageable with said receiving-side connector to lock said feeding-side and receiving-side connectors together.

12. A feeder connector according to claim 11, wherein said connectors-locking means comprises a spring-urged locking arm rotatably supported to said casing, and wherein said working portion of said release lever is located between said lever and said connectors-locking means such that stepwise operation of said release lever unlocks said lever and then unlocks said feeding-side and receiving-side connectors from each other.

* * * * *

UNITED STATES PATENT AND TRADEMARK OFFICE
CERTIFICATE OF CORRECTION

PATENT NO.  : 5,350,312
DATED       : September 27, 1994
INVENTOR(S) : KUNO et al.

It is certified that error appears in the above-identified patent and that said Letters Patent is hereby corrected as shown below:

On the Title page, Item [73], "Yazaka Corporation" should read --Yazaki Corporation--.

Signed and Sealed this

Twenty-eight Day of March, 1995

Attest:

BRUCE LEHMAN

*Attesting Officer*    Commissioner of Patents and Trademarks